US011887762B2

(12) United States Patent
Mori et al.

(10) Patent No.: US 11,887,762 B2
(45) Date of Patent: Jan. 30, 2024

(54) SOFT MAGNETIC METAL POWDER, DUST CORE, AND MAGNETIC COMPONENT

(71) Applicant: TDK CORPORATION, Tokyo (JP)

(72) Inventors: Satoko Mori, Tokyo (JP); Hiroyuki Matsumoto, Tokyo (JP); Kenji Horino, Tokyo (JP); Kazuhiro Yoshidome, Tokyo (JP); Takuma Nakano, Tokyo (JP); Seigo Tokoro, Tokyo (JP); Shota Otsuka, Tokyo (JP); Toru Ujiie, Tokyo (JP); Kentaro Mori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/296,367

(22) Filed: Mar. 8, 2019

(65) Prior Publication Data

US 2019/0279798 A1 Sep. 12, 2019

(30) Foreign Application Priority Data

Mar. 9, 2018 (JP) ................................ 2018-043644

(51) Int. Cl.

*H01F 1/20* (2006.01)
*H01F 1/147* (2006.01)

(Continued)

(52) U.S. Cl.

CPC ........... *H01F 1/20* (2013.01); *H01F 1/14733* (2013.01); *H01F 1/24* (2013.01); *H01F 1/26* (2013.01);

(Continued)

(58) Field of Classification Search

CPC .......... B22F 1/02; B22F 1/0018; B22F 1/025; H01F 1/20; H01F 1/26; H01F 1/24; H01F 1/33; H01F 1/36; H01F 1/14733; H01F 1/1475; H01F 1/15333; H01F 1/15308; H01F 1/15383; H01F 3/08; H01F 27/255; H01F 41/0246; H01F 1/22; H01F 1/14;

(Continued)

(56) References Cited

U.S. PATENT DOCUMENTS

| | | | | |
|---|---|---|---|---|
| 5,348,800 | A | 9/1994 | Moro et al. | |
| 9,208,932 | B2 * | 12/2015 | Igarashi | H01F 1/28 |

(Continued)

FOREIGN PATENT DOCUMENTS

| | | | |
|---|---|---|---|
| CN | 103846427 | A | 6/2014 |
| JP | H05-109520 | A | 4/1993 |

(Continued)

OTHER PUBLICATIONS

Orenchak, George. "Soft Ferrite Advantages, Capabilities & Markets", 1997 Soft Ferrite Users Conference. TSC Ferrite International. http://www.tscinternational.com/tech9.pdf. (Year: 1997).*

(Continued)

*Primary Examiner* — Mark Ruthkosky
*Assistant Examiner* — Rebecca L Grusby
(74) *Attorney, Agent, or Firm* — Oliff PLC

(57) ABSTRACT

A soft magnetic metal powder comprising soft magnetic metal particles including Fe, wherein a surface of the soft magnetic metal particle is covered by a coating part having an insulation property, and the coating part includes a soft magnetic metal fine particle.

14 Claims, 4 Drawing Sheets

(51) Int. Cl.

| | |
|---|---|
| ***H01F 1/36*** | (2006.01) |
| ***H01F 3/08*** | (2006.01) |
| ***H01F 1/26*** | (2006.01) |
| ***H01F 1/33*** | (2006.01) |
| ***H01F 1/24*** | (2006.01) |
| ***H01F 1/153*** | (2006.01) |
| ***H01F 41/02*** | (2006.01) |

(52) U.S. Cl.
CPC ................. *H01F 1/33* (2013.01); *H01F 1/36* (2013.01); *H01F 3/08* (2013.01); *H01F 1/15308* (2013.01); *H01F 1/15333* (2013.01); *H01F 41/0246* (2013.01)

(58) Field of Classification Search
CPC ... H01F 1/147; H01F 1/14691; H01F 1/15358
See application file for complete search history.

(56) References Cited

U.S. PATENT DOCUMENTS

| | | | | |
|---|---|---|---|---|
| 2006/0216507 | A1* | 9/2006 | Toyoda ..................... | H01F 1/26 428/402 |
| 2008/0258102 | A1* | 10/2008 | Hirose ................ | C22C 33/0228 252/62.51 R |
| 2009/0007418 | A1* | 1/2009 | Edo ..................... | H01F 41/0246 29/609 |
| 2013/0033354 | A1 | 2/2013 | An et al. | |
| 2014/0138570 | A1 | 5/2014 | Otsuka et al. | |
| 2014/0239219 | A1 | 8/2014 | An et al. | |
| 2014/0240078 | A1 | 8/2014 | An et al. | |
| 2015/0021512 | A1* | 1/2015 | Takahashi ................. | H01F 1/24 252/62.55 |
| 2016/0044838 | A1* | 2/2016 | Aga ...................... | B22F 1/0003 252/62 |
| 2016/0086728 | A1 | 3/2016 | Suetsuna et al. | |
| 2017/0209924 | A1* | 7/2017 | Suetsuna ................. | C22C 38/02 |
| 2018/0286548 | A1* | 10/2018 | Nakamura .......... | H01F 27/2823 |
| 2019/0103207 | A1* | 4/2019 | Sato .......................... | H01F 3/08 |
| 2019/0267170 | A1* | 8/2019 | Nakamura .............. | H01F 1/147 |

FOREIGN PATENT DOCUMENTS

| | | | | | |
|---|---|---|---|---|---|
| JP | 2005-136358 | A | | 5/2005 | |
| JP | 2007-254768 | A | | 10/2007 | |
| JP | 2010073967 | A | * | 4/2010 | |
| JP | 2013-033966 | A | | 2/2013 | |
| JP | 2015-103770 | A | | 6/2015 | |
| JP | 2015-132010 | A | | 7/2015 | |
| JP | 2016-086124 | A | | 5/2016 | |
| JP | 2017200860 | A | * | 11/2017 | ............. H01F 1/344 |

OTHER PUBLICATIONS

Machine Translation of JP 2017200860 (Year: 2017).*
Machine Translation of JP 2016086124 (Year: 2016).*
Machine Translation of JP 2015132010 (Year: 2015).*
Machine Translation of JP 2007-254768 via EPO (Year: 2007).*
Machine translation of JP 2010-073967 via EPO (Year: 2010).*

* cited by examiner

SOFT MAGNETIC METAL POWDER, DUST CORE, AND MAGNETIC COMPONENT

BACKGROUND OF THE INVENTION

The present invention relates to soft magnetic metal powder, a dust core, and a magnetic component.

As a magnetic component used in power circuits of various electronic equipment such as a transformer, a choke coil, an inductor, and the like are known.

Such magnetic component is configured so that a coil (winding coil) as an electrical conductor is disposed around or inside a core exhibiting predetermined magnetic properties.

As a magnetic material used to the core provided to the magnetic component such as an inductor and the like, a soft magnetic metal material including iron (Fe) may be mentioned as an example. The core can be obtained for example by compress molding the soft magnetic metal powder including particles constituted by a soft magnetic metal including Fe.

In such dust core, in order to improve the magnetic properties, a proportion (a filling ratio) of magnetic ingredients is increased. However, the soft magnetic metal has a low insulation property, thus in case the soft magnetic metal particles contact against each other, when voltage is applied to the magnetic component, a large loss is caused by current flowing between the particles in contact (inter-particle eddy current). As a result, a core loss of the dust core becomes large.

Thus, in order to suppress such eddy current, an insulation coating is formed on the surface of the soft magnetic metal particle. For example, Japanese Patent Application Laid-Open No. 2015-132010 discloses that powder glass including oxide of phosphorus (P) is softened by mechanical friction and adhered on the surface of Fe-based amorphous alloy powder to form an insulation coating layer.

[Patent Document 1] JP Patent Application Laid Open No. 2015-132010

BRIEF SUMMARY OF THE INVENTION

However, an insulation coating layer has a non-magnetic property, thus if the insulation coating layer becomes thicker, a proportion of ingredients contributing to magnetic properties become smaller in a dust core. As a result, predetermined magnetic properties, for example a magnetic permeability decreased.

On the other hand, if the insulation coating layer is not thick enough, a dielectric breakdown easily occurs, and a withstand voltage deteriorated.

The present invention is attained in view of such circumstances, and the object is to provide a dust core capable of attaining both a withstand voltage property and magnetic properties, a magnetic component including the dust core, and a soft magnetic metal powder suitable for the dust core.

The present inventors have found that the withstand voltage property and the magnetic properties can be both attained by securing sufficient thickness of the insulation coating layer formed outside of the soft magnetic metal particle, and by including the magnetic ingredients inside the insulation coating layer, thereby the present invention was attained.

That is, the present invention is

[1] A soft magnetic metal powder comprising soft magnetic metal particles including Fe, wherein a surface of the soft magnetic metal particles is covered by a coating part having an insulation property, and the coating part includes a soft magnetic metal fine particle.

[2] The soft magnetic metal powder according to [1], wherein the coating part includes a compound of at least one element selected from the group consisting of P, Si, Bi, and Zn as a main component.

[3] The soft magnetic metal powder according to [1] or [2], wherein an aspect ratio of the soft magnetic metal fine particle is 1:2 to 1:10000.

[4] The soft magnetic metal powder according to any one of [1] to [3], wherein a thickness of the coating part is 1 nm or more and 100 nm or less.

[5] The soft magnetic metal powder according to any one of [1] to [4], wherein the soft magnetic metal particle includes a crystalline region, and an average crystallite size is 1 nm or more and 50 nm or less.

[6] The soft magnetic metal powder according to any one of [1] to [4], wherein the soft magnetic metal particle is an amorphous.

[7] A dust core constituted from the soft magnetic metal powder according to any one [1] to [6].

[8] A magnetic component comprising the dust core according to [7].

According to the present invention, the dust core attaining both the withstand voltage property and the magnetic properties, the magnetic component including the dust core, and the soft magnetic metal powder suitable for the dust core can be provided.

DETAILED DESCRIPTION OF THE INVENTION

Hereinafter, the present invention is described in detail in the following order based on specific examples shown in figures.

1. Soft Magnetic Metal Powder
   1.1 Soft Magnetic Metal Particle
   1.2 Coating part
   1.2.1 Coating part Including Soft Magnetic Metal Fine Particle
   1.2.2. Other constitutions
2. Dust Core
3. Magnetic Component
4. Method of Producing Dust Core 4.1 Method of Producing Soft Magnetic Metal Powder 4.2 Method of Producing Dust Core (1. Soft Magnetic Metal Powder)

Figure 1:
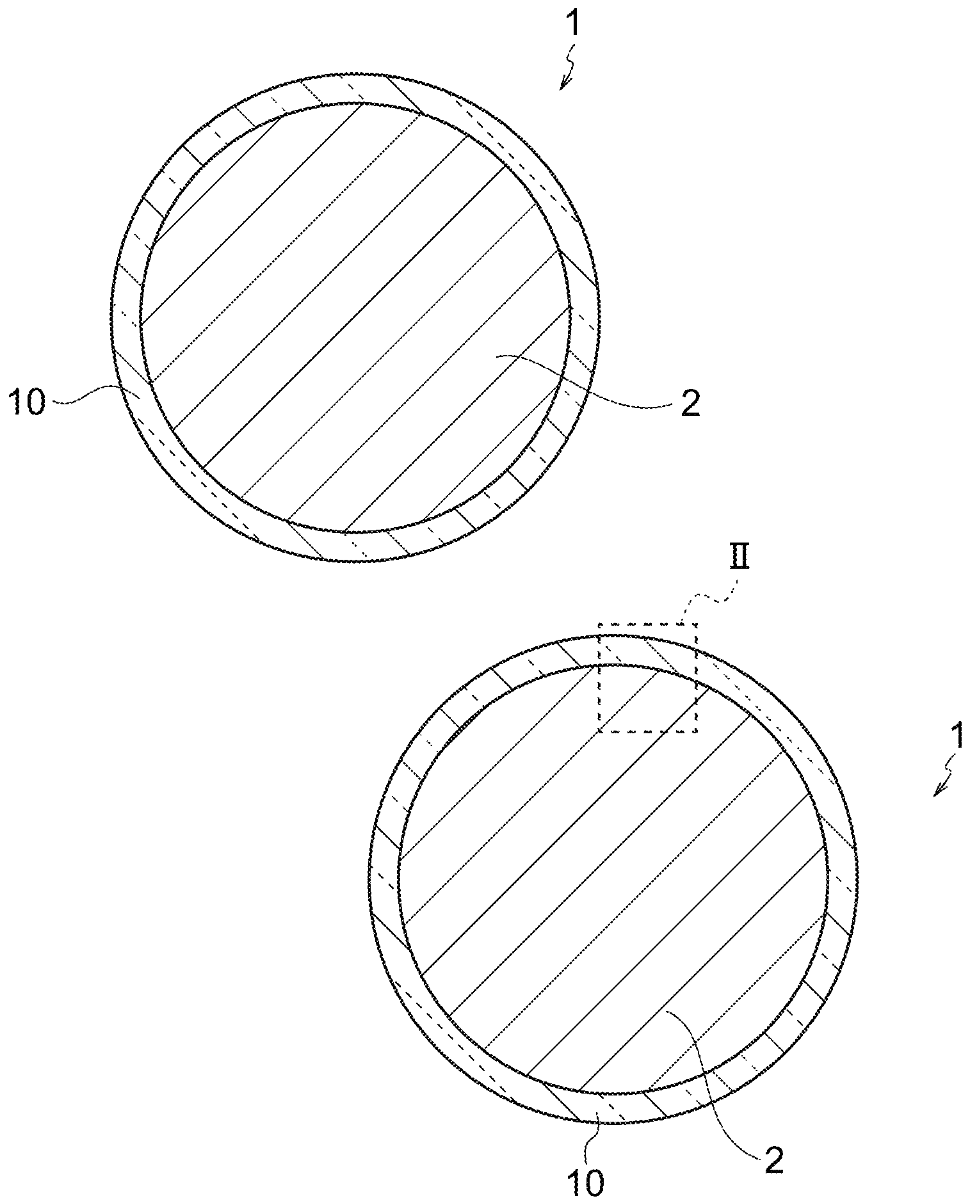
FIG. 1 is a schematic image of a cross section of a coated particle constituting soft magnetic metal powder according to the present embodiment.

As shown in FIG. 1, a soft magnetic metal powder according to the present embodiment includes coated particles of which a coating part 10 is formed to a surface of a soft magnetic metal particle 2. When a number ratio of the particle included in the soft magnetic metal powder is 100%, a number ratio of the coated particle is preferably 90% or more, and more preferably 95% or more. Note that, shape of the soft magnetic metal particle 2 is not particularly limited, and it is usually spherical.

Also, an average particle size (D50) of the soft magnetic metal powder according to the present embodiment may be selected depending on purpose of use and material. In the present embodiment, the average particle size (D50) is preferably within the range of 0.3 to 100 μm. By setting the average particle size of the soft magnetic metal powder within the above mentioned range, sufficient moldability and predetermined magnetic properties can be easily maintained. A method of measuring the average particle size is not particularly limited, and preferably a laser diffraction scattering method is used.

(1.1 Soft Magnetic Metal Particle)

In the present embodiment, a material of the soft magnetic metal particle is not particularly limited as long as the material includes Fe and has soft magnetic property. Effects of the soft magnetic metal powder according to the present embodiment are mainly due to a coating part which is described in below, and the material of the soft magnetic metal particle has only little contribution.

As the material including Fe and having soft magnetic property, pure iron, Fe-based alloy, Fe—Si-based alloy, Fe—Al-based alloy, Fe—Ni-based alloy, Fe—Si—Al-based alloy, Fe—Si—Cr-based alloy, Fe—Ni—Si—Co-based alloy, Fe-based amorphous alloy, Fe-based nanocrystal alloy, and the like may be mentioned.

Fe-based amorphous alloy has random alignment of atom constituting the alloy, and it is an amorphous alloy which has no crystallinity as a whole. As Fe-based amorphous alloy, for example, Fe—Si—B-based alloy, Fe—Si—B—Cr—C-based alloy, and the like may be mentioned.

Fe-based nanocrystal alloy is an alloy of which a microcrystal of a nanometer order is deposited in an amorphous substance by heat treating Fe-based alloy having a nanohetero structure in which an initial microcrystal exists in the amorphous substance.

In the present embodiment, the average crystallite size of the soft magnetic metal particle constituted by the Fe-based nanocrystal alloy is preferably 1 nm or more and 50 nm or less, and more preferably 5 nm or more and 30 nm or less. By having the average crystallite size within the above range, even when stress is applied to the particle while forming the coating part to the soft magnetic metal particle, a coercivity can be suppressed from increasing.

As Fe-based nanocrystal alloy, for example, Fe—Nb—B-based alloy, Fe—Si—Nb—B—Cu-based alloy, Fe—Si—P—B—Cu-based alloy, and the like may be mentioned.

Also, in the present embodiment, the soft magnetic metal powder may include only the soft magnetic metal particle made of same material, and also the soft magnetic metal particles having different materials may be mixed. For example, the soft magnetic metal powder may be a mixture of a plurality of types of Fe-based alloy particles and a plurality of types of Fe—Si-based alloy particles.

Note that, as an example of a different material, in case of using different elements for constituting the metal or the alloy, in case of using same elements for constituting the metal or the alloy but having different compositions, in case of having different crystal structure, and the like may be mentioned.

(1.2. Coating Part)

As shown in FIG. 1, the coating part 10 is formed to cover the surface of the soft magnetic metal particle 2. In the present embodiment, by referring that the surface is covered by a substance, it means that the substance is in contact with the surface and the substance is fixed to cover the part which is in contact. Also, the coating part which covers the surface of the soft magnetic metal particle or the coating part only needs to cover at least part of the surface of the particle, and preferably the entire surface is covered. Further, the coating part may cover the surface continuously, or it may cover in discontinuous manner.

(1.2.1. Coating Part Including Soft Magnetic Metal Fine Particle)

The coating part 10 may be constituted in any way as long as the soft magnetic metal particles constituting the soft magnetic metal powder can be insulated against each other. In the present embodiment, the coating part 10 preferably includes the compound of at least one element selected from the group consisting of P, Si, Bi, and Zn. Also, the compound is preferably oxides, and particularly preferably it is oxide glass.

Also, the compound of at least one element selected from the group consisting of P, Si, Bi, and Zn is preferably included as the main component of the coating part 10. By referring "including oxides of at least one element selected from the group consisting of P, Si, Bi, and Zn as the main component", this means that when a total content of the elements excluding oxygen included in the coating part 10 is 100 mass %, a total content of at least one element selected from the group consisting of P, Si, Bi, and Zn is the largest. Also in the present embodiment, the total content of these elements are preferably 50 mass % or more, and more preferably 60 mass % or more.

The oxide glass is not particularly limited, and for example phosphate ($P_2O_5$) based glass, bismuthate ($Bi_2O_3$) based glass, borosilicate ($B_2O_3$—$SiO_2$) based glass, and the like may be mentioned.

As $P_2O_5$-based glass, a glass including 50 wt % or more of $P_2O_5$ is preferable, and for example $P_2O_5$—ZnO—$R_2O$—$Al_2O_3$-based glass and the like may be mentioned. Note that, "R" represents an alkaline metal.

As $Bi_2O_3$-based glass, a glass including 50 wt % or more of $Bi_2O_3$ is preferable, and for example $Bi_2O_3$—ZnO—$B_2O_3$—$SiO_2$-based glass and the like may be mentioned.

As $B_2O_3$—$SiO_2$-based glass, a glass including 10 wt % or more of $B_2O_3$ and 10 wt % or more of $SiO_2$ is preferable, and for example BaO—ZnO—$B_2O_3$—$SiO_2$—$Al_2O_3$-based glass and the like may be mentioned.

By including such coating part, the coated particle exhibits high insulation property, thus the resistivity of the dust core constituted by the soft magnetic metal powder including the coated particle improves.

Figure 2:
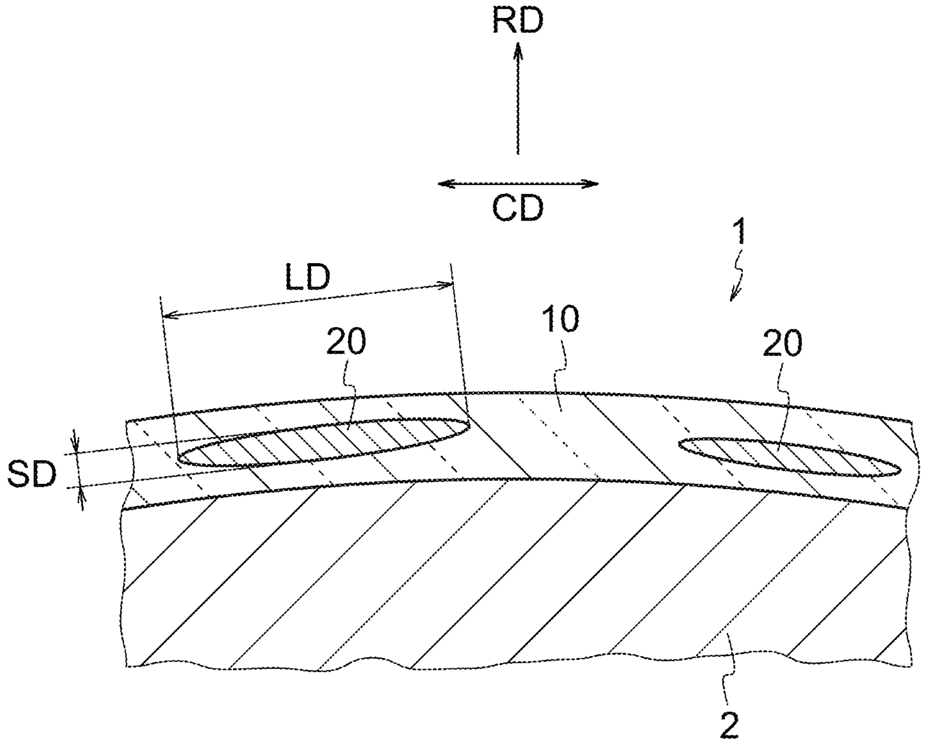
FIG. 2 is a schematic image of an enlarged cross section of II part shown in FIG. 1.

As shown in FIG. 2, in the present embodiment, the soft magnetic metal fine particle 20 exists inside the coating part 10. In the coated particle 1, the fine particle exhibiting a soft magnetic property exists inside the coating part 10 which is the outermost layer, thereby even in case the coating part is made thicker, that is even in case the insulation property of the dust core is enhanced, the magnetic permeability of the dust core can be suppressed from decreasing. Thus, both the withstand voltage property and the magnetic properties of the dust core can be attained.

Also, a short diameter direction SD of the soft magnetic metal fine particle 20 is preferably approximately parallel to a radial direction RD of the coated particle 1 rather than to a circumference direction CD of the coated particle 1; and a long diameter direction LD of the soft magnetic metal fine powder 20 is preferably approximately parallel to the circumference direction CD of the coated particle 1 rather than to the radial direction RD of the coated particle 1. By constituting as such, even when pressure is applied to each coated particle when pressure powder molding is performed to the soft magnetic metal powder according to the present embodiment, pressure applied to the soft magnetic metal fine particle 20 can be dispersed. Hence, even if the soft magnetic metal fine particle 20 exists, the coating part is suppressed from breaking, and the insulation property of the dust core can be maintained.

Also, the aspect ratio calculated from the long diameter and the short diameter of the soft magnetic metal fine particle 20 is preferably 1:2 to 1:10000 (short diameter:long diameter). Also, the aspect ratio is preferably 1:2 or larger, and more preferably 1:10 or larger. On the other hand, it is preferably 1:1000 or less, and more preferably 1:100 or less. By giving anisotropy to the shape of the soft magnetic metal fine particle 20, a magnetic flux running through the soft magnetic metal fine particle 20 does not concentrate to one point and will be dispersed. Therefore, a magnetic saturation at a contact point of the powder can be suppressed, and as a result, a good DC superimposition property of the dust core can be obtained. Note that, the long diameter of the soft magnetic metal fine particle 20 is not particularly limited as long as the soft magnetic metal fine particle 20 exists inside the coating part 10, and for example it is 10 nm or more and 1000 nm or less.

The material of the soft magnetic metal fine particle 20 is not particularly limited as long as it exhibits the soft magnetic property. Specifically, Fe, Fe—Co-based alloy, Fe—Ni—Cr-based alloy, and the like may be mentioned. Also, it may be the same material as the soft magnetic metal particle 2 to which the coating part 10 is formed, or it may be different.

In the present embodiment, when the number ratio of the coated particle 1 included in the soft magnetic metal powder is 100%, the number ratio of the coated particle 1 having the soft magnetic metal fine particle 20 in the coating part 10 is not particularly limited, and for example it is preferably 50% or more and 100% or less.

Components included in the coating part can be identified by information such as an element analysis of Energy Dispersive X-ray Spectroscopy (EDS) using Transmission Electron Microscope (TEM) such as Scanning Transmission Electron Microscope (STEM) and the like, an element analysis of Electron Energy Loss Spectroscopy (EELS), a lattice constant of a Fast Fourier Transformation (FFT) analysis of TEM image, and the like.

The thickness of the coating part 10 is not particularly limited as long as the above mentioned effect can be obtained. In the present embodiment, 5 nm or more and 200 nm or less is preferable. Also, 150 nm or less is more preferable, and 50 nm or less is further preferable.

(1.2.2. Other Constitutions)

In case the coating part 10 includes the compound of at least one element selected from the group consisting of P, Si, Bi, and Zn, other coating part (coating part A) may be formed between the soft magnetic metal particle 2 and the coating part 10. Such coating part A preferably includes oxide of Fe as the main component. Also, oxide of Fe preferably is dense oxide.

Also, when the coating part 10 includes a compound of P, other coating part (coating part B) may be formed between the soft magnetic metal particle 2 and the coating part 10. Such coating part B preferably includes at least one element selected from the group consisting of Cu, W, Mo, and Cr. That is, these elements preferably exist as simple metal.

In case the above mentioned coating part A or coating part B is formed between the soft magnetic metal particle 2 and the coating part 10, this prevents Fe constituting the soft magnetic metal particle 2 from moving to the coating part 10 and reacting with other components in the coating part 10. As a result, both the withstand voltage and the magnetic properties of the dust core can be attained, and also the heat resistance of the dust core can be improved.

(2. Dust Core)

The dust core according to the present embodiment is constituted from the above mentioned soft magnetic metal powder, and it is not particularly limited as long as it is formed to have predetermined shape. In the present embodiment, the dust core includes the soft magnetic metal powder and a resin as a binder, and the soft magnetic metal powder is fixed to a predetermined shape by binding the soft magnetic metal particles constituting the soft magnetic metal powder with each other via the resin. Also, the dust core may be constituted from the mixed powder of the above mentioned soft magnetic metal powder and other magnetic powder, and may be formed into a predetermined shape.

(3. Magnetic Component)

The magnetic component according to the present embodiment is not particularly limited as long as it is provided with the above mentioned dust core. For example, it may be a magnetic component in which an air coil with a wire wound around is embedded inside the dust core having a predetermined shape, or it may be a magnetic component of which a wire is wound for a predetermined number of turns to a surface of the dust core having a predetermined shape. The magnetic component according to the present embodiment is suitable for a power inductor used for a power circuit.

(4. Method of Producing Dust Core)

Next, the method of producing the dust core included in the above mentioned magnetic component is described. First, the method of producing the soft magnetic metal powder constituting the dust core is described.

(4.1. Method of Producing Magnetic Metal Powder)

In the present embodiment, the soft magnetic metal powder before the coating part is formed can be obtained by a same method as a known method of producing the soft magnetic metal powder. Specifically, the soft magnetic metal powder can be produced using a gas atomization method, a water atomization method, a rotary disk method, and the like. Also, the soft magnetic metal powder can be produced by mechanically pulverizing a thin ribbon obtained by a single-roll method. Among these, from a point of easily obtaining the soft magnetic metal powder having desirable magnetic properties, a gas atomization method is preferably used.

In a gas atomization method, at first, a molten metal is obtained which is formed by melting the raw materials of the soft magnetic metal constituting the soft magnetic metal powder. The raw materials of each metal element (such as pure metal and the like) included in the soft magnetic metal is prepared, and these are weighed so that the composition of the soft magnetic metal obtained at end can be attained, and these raw materials are melted. Note that, the method of melting the raw materials of the metal elements is not particularly limited, but the method of melting by high frequency heating after vacuuming inside the chamber of an atomizing apparatus may be mentioned. The temperature during melting may be determined depending on the melting point of each metal element, and for example it can be 1200 to 1500° C.

The obtained molten metal is supplied into the chamber as continuous line of fluid through a nozzle provided to a bottom of a crucible, then high pressure gas is blown to the supplied molten metal to form droplets of molten metal and rapidly cooled, thereby fine powder was obtained. A gas blowing temperature, a pressure inside the chamber, and the like can be determined depending of the composition of the soft magnetic metal. Also, as for the particle size, a particle size can be adjusted by a sieve classification, an air stream classification, and the like.

Next, the coating part is formed to the obtained soft magnetic metal particle. A method of forming the coating part is not particularly limited, and a known method can be employed. The coating part may be formed by carrying out a wet treatment to the soft magnetic metal particle, or the coating part may be formed by carrying out a dry treatment.

Figure 3:
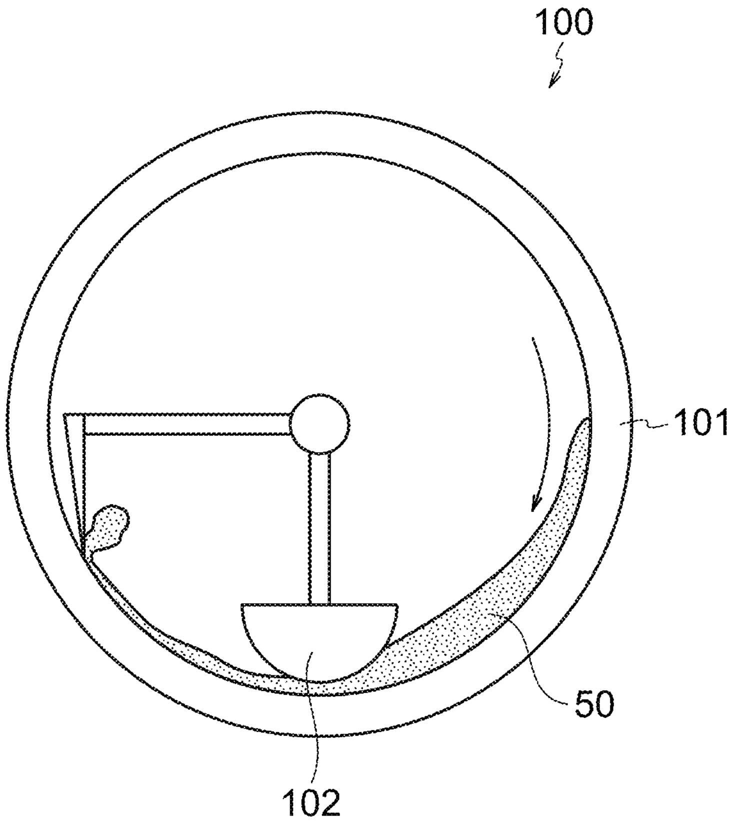
FIG. 3 is a schematic image of a cross section showing a constitution of powder coating apparatus used for forming a coating part.

In the present embodiment, the coating part can be formed by a mechanochemical coating method, a phosphate treatment method, a sol-gel method, and the like. As the mechanochemical coating method, for example, a powder coating apparatus 100 shown in FIG. 3 is used. The soft magnetic metal powder, and a mixture powder including a powder form coating material of the material (compound of P, Si, Bi, Zn, and the like) constituting the coating part and the soft magnetic metal fine particle are introduced into a container 101 of the powder coating apparatus. After introducing these into the container 101, it is rotated, thereby the mixture 50 including the soft magnetic metal powder and the mixture powder is compressed between a grinder 102 and an inner wall of the container 101 and heat is generated by friction. Due to this friction heat, the powder form coating material is softened, and while the soft magnetic metal fine particle is included inside, the powder form coating material is adhered to the surface of the soft magnetic metal particle by a compression effect, thereby the coating part including the soft magnetic metal fine particle inside can be formed.

The mechanochemical coating method adjusts a rotation speed of the container, a distance between a grinder and an inner wall of the container, and the like to control the heat generated by friction, thereby the temperature of the mixture of the soft magnetic metal powder and the mixture powder can be controlled. In the present embodiment, the temperature is preferably 50° C. or higher and 150° C. or lower.

Note that, a ratio of the soft magnetic metal fine particle is preferably 0.00001 to 0.5 wt % or so with respect to 100 wt % of the mixture powder of powder form coating material and soft magnetic metal fine particle.

(4.2. Method of Producing Dust Core)

The dust core is produced by using the above mentioned soft magnetic metal powder. A method of production is not particularly limited, and a known method can be employed. First, the soft magnetic metal powder including the soft magnetic metal particle formed with the coating part, and a known resin as the binder are mixed to obtain a mixture. Also, if needed, the obtained mixture may be formed into granulated powder. Further, the mixture or the granulated powder is filled into a metal mold and compression molding is carried out, and a molded body having a shape of the core dust to be produced is obtained. The obtained molded body, for example, is carried out with a heat treatment at 50 to 200° C. to cure the resin, and the dust core having a predetermined shape of which the soft magnetic metal particle is fixed via the resin can be obtained. By winding a wire for a predetermined number of turns to the obtained dust core, the magnetic component such as an inductor and the like can be obtained.

Also, the above mentioned mixture or granulated powder and an air coil formed by winding a wire for predetermined number of turns may be filled in a metal mold and compress mold to embed the coil inside, thereby the molded body embedded with a coil inside may be obtained. By carrying out a heat treatment to the obtained molded body, the dust core having a predetermined shape embedded with the coil can be obtained. A coil is embedded inside of such dust core, thus it can function as the magnetic component such as an inductor and the like.

Hereinabove, the embodiment of the present invention has been described, however the present invention is not to be limited thereto, and various modifications may be done within scope of the present invention.

EXAMPLES

Hereinafter, the present invention is described in further detail using examples, however the present invention is not to be limited to these examples.

(Experiments 1 to 66)

First, powder including particles constituted by a soft magnetic metal having a composition shown in Table 1 and 2 and having an average particle size D50 shown in Table 1 and 2 were prepared. The prepared powder was introduced into a container of a powder coating apparatus together with a powder glass (coating material) having a composition shown in Table 1 and 2, and a soft magnetic metal fine particle having a composition and size shown in Table 1 and 2. Then, the surface of the soft magnetic metal particle was coated with the powder glass to form a coating part, thereby the soft magnetic metal powder was obtained.

The powder glass was added in an amount of 0.5 wt % with respect to 100 wt % of the powder. Also, the soft magnetic metal fine particle was added in an amount of 0.01 wt % with respect to 100 wt % of the powder.

Also, in the present example, for $P_2O_5$—ZnO—$R_2O$—$Al_2O_3$-powder glass as a phosphate-based glass, $P_2O_5$ was 50 wt %, ZnO was 12 wt %, $R_2O$ was 20 wt %, $Al_2O_3$ was 6 wt %, and the rest was subcomponents.

Note that, the present inventors have carried out the same experiment to a glass having a composition including $P_2O_5$ of 60 wt %, ZnO of 20 wt %, $R_2O$ of 10 wt %, $Al_2O_3$ of 5 wt %, and the rest made of subcomponents, and the like; and have verified that the same results as mentioned in below can be obtained.

Also, in the present example, for $Bi_2O_3$—ZnO—$B_2O_3$—$SiO_2$-based powder glass as a bismuthate-based glass, $Bi_2O_3$ was 80 wt %, ZnO was 10 wt %, $B_2O_3$ was 5 wt %, and $SiO_2$ was 5 wt %. As a bismuthate-based glass, a glass having other composition was also subjected to the same experiment, and was confirmed that the same results as describe in below can be obtained.

Also, in the present example, for BaO—ZnO—$B_2O_3$—$SiO_2$—$Al_2O_3$-based powder glass as a borosilicate-based glass, BaO was 8 wt %, ZnO was 23 wt %, $B_2O_3$ was 19 wt %, $SiO_2$ was 16 wt %, $Al_2O_3$ was 6 wt %, and the rest was subcomponents. As borosilicate-based glass, a glass having other composition was also subjected to the same experiment, and was confirmed that the same results as describe in below can be obtained.

Figure 4:
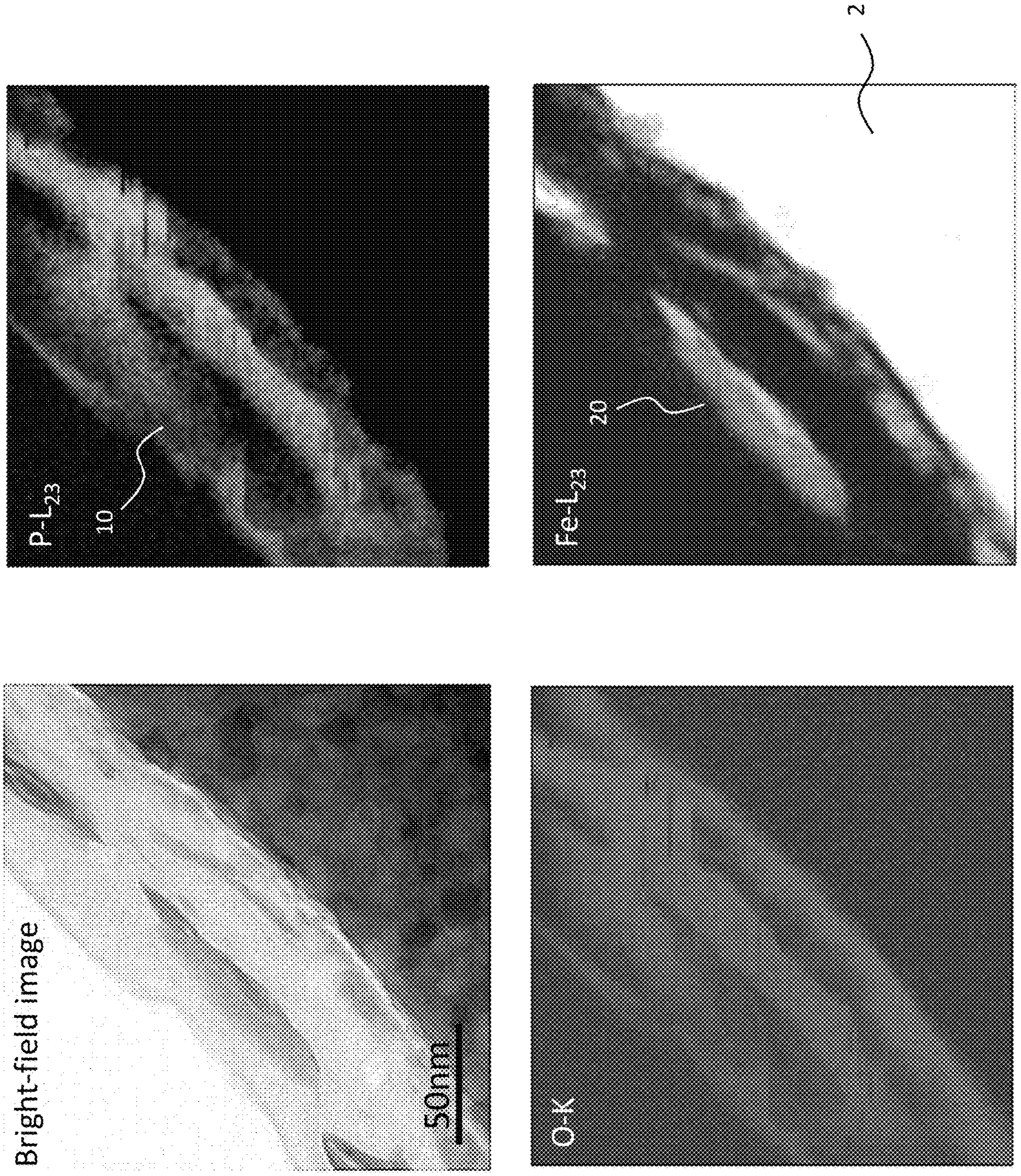
FIG. 4 is STEM-EELS spectrum image near the coating part of the coated particle in examples of the present invention.

Among the produced soft magnetic metal powder, to a sample of Experiment 18, a bright-field image near the coating part of the coated particle was obtained by STEM. The obtained bright-field image is shown in FIG. 4. Also, a spectrum analysis of EELS of the bright-field image shown in FIG. 4 was carried out, and an element mapping was done. According to the result of the bright-field image shown in FIG. 4 and the element mapping, it was confirmed that the soft magnetic metal fine particle having Fe and having an aspect ratio of 1:10 existed inside the coating part.

Next, the dust core was produced using the obtained soft magnetic metal powder. Epoxy resin as a heat curing resin and imide resin as curing agent were weighed, and added to acetone to form a solution, then this solution and the soft magnetic metal powder were mixed. After mixing, granules obtained by evaporating acetone were sieved using 355 μm mesh. This was filled in a metal mold of a toroidal shape having outer diameter of 11 mm and inner diameter of 6.5 mm, and molding pressure of 3.0 t/cm$^2$ was applied, thereby the molded body of the dust core was obtained. The dust core was obtained by curing the resin of the obtained molded body of the dust core at 180° C. for 1 hour.

Note that, a total amount of epoxy resin and imide resin was adjusted depending on the filling ratio of the soft magnetic metal powder occupying the dust core. The filling ratio was adjusted so that a magnetic permeability (μ0) of the dust core was 27 to 28.

The magnetic permeability (μ0) and a magnetic permeability (μ8k) of the sample of the produced dust core were measured. The ratio of μ8k with respect to the measured μ0 was calculated. This ratio indicates the decreasing rate of the magnetic permeability when DC is applied to the dust core. Therefore, this ratio shows DC superimposition property, and the closer this ratio is to 1, the better the DC superimposition property is. Results are shown in Table 1 and 2.

TABLE 1

| Experiment No. | Comparative example/ Example | Soft magnetic metal powder: Soft magnetic metal particle: Crystal type | Composition | Average particle size D50 (μm) | Coating part: Coating material | Soft magnetic metal fine particle: Composition | Aspect ratio | Dust core Property: Magnetic permeability: μ0 | μ8k | μ8k/μ0 |
|---|---|---|---|---|---|---|---|---|---|---|
| 1 | Comparative example | Crystalline | 93.5Fe—6.5Si | 20 | $P_2O_5$—ZnO—$R_2O$—$Al_2O_3$ | — | — | 28 | 18 | 0.63 |
| 2 | Example | Crystalline | 93.5Fe—6.5Si | 20 | $P_2O_5$—ZnO—$R_2O$—$Al_2O_3$ | Fe | 1:1 | 28 | 22 | 0.78 |
| 3 | Example | Crystalline | 93.5Fe—6.5Si | 20 | $P_2O_5$—ZnO—$R_2O$—$Al_2O_3$ | Fe | 1:2 | 28 | 22 | 0.79 |
| 4 | Example | Crystalline | 93.5Fe—6.5Si | 20 | $P_2O_5$—ZnO—$R_2O$—$Al_2O_3$ | Fe | 1:10 | 28 | 22 | 0.80 |
| 5 | Example | Crystalline | 93.5Fe—6.5Si | 20 | $P_2O_5$—ZnO—$R_2O$—$Al_2O_3$ | Fe | 1:100 | 28 | 27 | 0.95 |
| 6 | Example | Crystalline | 93.5Fe—6.5Si | 20 | $P_2O_5$—ZnO—$R_2O$—$Al_2O_3$ | Fe | 1:1000 | 27 | 24 | 0.88 |
| 7 | Example | Crystalline | 93.5Fe—6.5Si | 20 | $P_2O_5$—ZnO—$R_2O$—$Al_2O_3$ | Fe | 1:10000 | 28 | 25 | 0.89 |
| 8 | Comparative example | Amorphous | 87.55Fe—6.7Si—2.5Cr—2.5B—0.75C | 20 | $P_2O_5$—ZnO—$R_2O$—$Al_2O_3$ | — | — | 28 | 18 | 0.63 |
| 9 | Example | Amorphous | 87.55Fe—6.7Si—2.5Cr—2.5B—0.75C | 20 | $P_2O_5$—ZnO—$R_2O$—$Al_2O_3$ | Fe | 1:1 | 27 | 19 | 0.71 |
| 10 | Example | Amorphous | 87.55Fe—6.7Si—2.5Cr—2.5B—0.75C | 20 | $P_2O_5$—ZnO—$R_2O$—$Al_2O_3$ | Fe | 1:2 | 28 | 21 | 0.75 |
| 11 | Example | Amorphous | 87.55Fe—6.7Si—2.5Cr—2.5B—0.75C | 20 | $P_2O_5$—ZnO—$R_2O$—$Al_2O_3$ | Fe | 1:10 | 28 | 21 | 0.76 |
| 12 | Example | Amorphous | 87.55Fe—6.7Si—2.5Cr—2.5B—0.75C | 20 | $P_2O_5$—ZnO—$R_2O$—$Al_2O_3$ | Fe | 1:100 | 28 | 22 | 0.77 |
| 13 | Example | Amorphous | 87.55Fe—6.7Si—2.5Cr—2.5B—0.75C | 20 | $P_2O_5$—ZnO—$R_2O$—$Al_2O_3$ | Fe | 1:1000 | 28 | 23 | 0.81 |
| 14 | Example | Amorphous | 87.55Fe—6.7Si—2.5Cr—2.5B—0.75C | 20 | $P_2O_5$—ZnO—$R_2O$—$Al_2O_3$ | Fe | 1:10000 | 28 | 24 | 0.84 |
| 15 | Comparative example | Nanocrystal | 83.4Fe—5.6Nb—2B—7.7Si—1.3Cu | 25 | $P_2O_5$—ZnO—$R_2O$—$Al_2O_3$ | — | — | 29 | 18 | 0.63 |
| 16 | Example | Nanocrystal | 83.4Fe—5.6Nb—2B—7.7Si—1.3Cu | 25 | $P_2O_5$—ZnO—$R_2O$—$Al_2O_3$ | Fe | 1:1 | 28 | 21 | 0.74 |
| 17 | Example | Nanocrystal | 83.4Fe—5.6Nb—2B—7.7Si—1.3Cu | 25 | $P_2O_5$—ZnO—$R_2O$—$Al_2O_3$ | Fe | 1:2 | 28 | 21 | 0.74 |
| 18 | Example | Nanocrystal | 83.4Fe—5.6Nb—2B—7.7Si—1.3Cu | 25 | $P_2O_5$—ZnO—$R_2O$—$Al_2O_3$ | Fe | 1:10 | 28 | 21 | 0.75 |
| 19 | Example | Nanocrystal | 83.4Fe—5.6Nb—2B—7.7Si—1.3Cu | 25 | $P_2O_5$—ZnO—$R_2O$—$Al_2O_3$ | Fe | 1:100 | 28 | 22 | 0.79 |
| 20 | Example | Nanocrystal | 83.4Fe—5.6Nb—2B—7.7Si—1.3Cu | 25 | $P_2O_5$—ZnO—$R_2O$—$Al_2O_3$ | Fe | 1:1000 | 28 | 22 | 0.79 |
| 21 | Example | Nanocrystal | 83.4Fe—5.6Nb—2B—7.7Si—1.3Cu | 25 | $P_2O_5$—ZnO—$R_2O$—$Al_2O_3$ | Fe | 1:10000 | 28 | 22 | 0.79 |
| 22 | Example | Nanocrystal | 83.4Fe—5.6Nb—2B—7.7Si—1.3Cu | 25 | $P_2O_5$—ZnO—$R_2O$—$Al_2O_3$ | 70Fe—10Ni—20Cr | 1:1 | 28 | 21 | 0.75 |
| 23 | Example | Nanocrystal | 83.4Fe—5.6Nb—2B—7.7Si—1.3Cu | 25 | $P_2O_5$—ZnO—$R_2O$—$Al_2O_3$ | 70Fe—10Ni—20Cr | 1:2 | 28 | 21 | 0.74 |
| 24 | Example | Nanocrystal | 83.4Fe—5.6Nb—2B—7.7Si—1.3Cu | 25 | $P_2O_5$—ZnO—$R_2O$—$Al_2O_3$ | 70Fe—10Ni—20Cr | 1:10 | 28 | 21 | 0.75 |
| 25 | Example | Nanocrystal | 83.4Fe—5.6Nb—2B—7.7Si—1.3Cu | 25 | $P_2O_5$—ZnO—$R_2O$—$Al_2O_3$ | 70Fe—10Ni—20Cr | 1:100 | 29 | 22 | 0.76 |
| 26 | Example | Nanocrystal | 83.4Fe—5.6Nb—2B—7.7Si—1.3Cu | 25 | $P_2O_5$—ZnO—$R_2O$—$Al_2O_3$ | 70Fe—10Ni—20Cr | 1:1000 | 29 | 22 | 0.75 |
| 27 | Example | Nanocrystal | 83.4Fe—5.6Nb—2B—7.7Si—1.3Cu | 25 | $P_2O_5$—ZnO—$R_2O$—$Al_2O_3$ | 70Fe—10Ni—20Cr | 1:10000 | 28 | 22 | 0.78 |
| 28 | Comparative example | Nanocrystal | 83.4Fe—5.6Nb—2B—7.7Si—1.3Cu | 25 | $Bi_2O_3$—ZnO—$B_2O_3$—$SiO_2$ | — | — | 28 | 18 | 0.64 |
| 29 | Example | Nanocrystal | 83.4Fe—5.6Nb—2B—7.7Si—1.3Cu | 25 | $Bi_2O_3$—ZnO—$B_2O_3$—$SiO_2$ | Fe | 1:1 | 29 | 21 | 0.71 |
| 30 | Example | Nanocrystal | 83.4Fe—5.6Nb—2B—7.7Si—1.3Cu | 25 | $Bi_2O_3$—ZnO—$B_2O_3$—$SiO_2$ | Fe | 1:2 | 28 | 20 | 0.73 |
| 31 | Example | Nanocrystal | 83.4Fe—5.6Nb—2B—7.7Si—1.3Cu | 25 | $Bi_2O_3$—ZnO—$B_2O_3$—$SiO_2$ | Fe | 1:10 | 28 | 21 | 0.74 |
| 32 | Example | Nanocrystal | 83.4Fe—5.6Nb—2B—7.7Si—1.3Cu | 25 | $Bi_2O_3$—ZnO—$B_2O_3$—$SiO_2$ | Fe | 1:100 | 28 | 21 | 0.75 |
| 33 | Example | Nanocrystal | 83.4Fe—5.6Nb—2B—7.7Si—1.3Cu | 25 | $Bi_2O_3$—ZnO—$B_2O_3$—$SiO_2$ | Fe | 1:1000 | 29 | 22 | 0.76 |
| 34 | Example | Nanocrystal | 83.4Fe—5.6Nb—2B—7.7Si—1.3Cu | 25 | $Bi_2O_3$—ZnO—$B_2O_3$—$SiO_2$ | Fe | 1:10000 | 27 | 21 | 0.79 |

TABLE 2

| Experiment No. | Comparative example/ Example | Soft magnetic metal powder — Soft magnetic metal particle — Crystal type | Composition | Average particle size D50 (μm) | Coating part — Coating material | Soft magnetic metal fine particle — Composition | Aspect ratio | Dust core Property — Magnetic permeability μ0 | μ8k | μ8k/μ0 |
|---|---|---|---|---|---|---|---|---|---|---|
| 35 | Example | Nanocrystal | 83.4Fe—5.6Nb—2B—7.7Si—1.3Cu | 25 | $Bi_2O_3$—ZnO—$B_2O_3$—$SiO_2$ | 70Fe—10Ni—20Cr | 1:1 | 28 | 20 | 0.71 |
| 36 | Example | Nanocrystal | 83.4Fe—5.6Nb—2B—7.7Si—1.3Cu | 25 | $Bi_2O_3$—ZnO—$B_2O_3$—$SiO_2$ | 70Fe—10Ni—20Cr | 1:2 | 29 | 21 | 0.72 |
| 37 | Example | Nanocrystal | 83.4Fe—5.6Nb—2B—7.7Si—1.3Cu | 25 | $Bi_2O_3$—ZnO—$B_2O_3$—$SiO_2$ | 70Fe—10Ni—20Cr | 1:10 | 28 | 21 | 0.74 |
| 38 | Example | Nanocrystal | 83.4Fe—5.6Nb—2B—7.7Si—1.3Cu | 25 | $Bi_2O_3$—ZnO—$B_2O_3$—$SiO_2$ | 70Fe—10Ni—20Cr | 1:100 | 27 | 20 | 0.75 |
| 39 | Example | Nanocrystal | 83.4Fe—5.6Nb—2B—7.7Si—1.3Cu | 25 | $Bi_2O_3$—ZnO—$B_2O_3$—$SiO_2$ | 70Fe—10Ni—20Cr | 1:1000 | 28 | 21 | 0.76 |
| 40 | Example | Nanocrystal | 83.4Fe—5.6Nb—2B—7.7Si—1.3Cu | 25 | $Bi_2O_3$—ZnO—$B_2O_3$—$SiO_2$ | 70Fe—10Ni—20Cr | 1:10000 | 28 | 22 | 0.79 |
| 41 | Comparative example | Nanocrystal | 83.4Fe—5.6Nb—2B—7.7Si—1.3Cu | 25 | BaO—ZnO—$B_2O_3$—$SiO_2$—$Al_2O_3$ | — | — | 29 | 18 | 0.63 |
| 42 | Example | Nanocrystal | 83.4Fe—5.6Nb—2B—7.7Si—1.3Cu | 25 | BaO—ZnO—$B_2O_3$—$SiO_2$—$Al_2O_3$ | Fe | 1:1 | 28 | 20 | 0.71 |
| 43 | Example | Nanocrystal | 83.4Fe—5.6Nb—2B—7.7Si—1.3Cu | 25 | BaO—ZnO—$B_2O_3$—$SiO_2$—$Al_2O_3$ | Fe | 1:2 | 28 | 20 | 0.72 |
| 44 | Example | Nanocrystal | 83.4Fe—5.6Nb—2B—7.7Si—1.3Cu | 25 | BaO—ZnO—$B_2O_3$—$SiO_2$—$Al_2O_3$ | Fe | 1:10 | 28 | 20 | 0.73 |
| 45 | Example | Nanocrystal | 83.4Fe—5.6Nb—2B—7.7Si—1.3Cu | 25 | BaO—ZnO—$B_2O_3$—$SiO_2$—$Al_2O_3$ | Fe | 1:100 | 28 | 21 | 0.75 |
| 46 | Example | Nanocrystal | 83.4Fe—5.6Nb—2B—7.7Si—1.3Cu | 25 | BaO—ZnO—$B_2O_3$—$SiO_2$—$Al_2O_3$ | Fe | 1:1000 | 28 | 21 | 0.76 |
| 47 | Example | Nanocrystal | 83.4Fe—5.6Nb—2B—7.7Si—1.3Cu | 25 | BaO—ZnO—$B_2O_3$—$SiO_2$—$Al_2O_3$ | Fe | 1:10000 | 27 | 21 | 0.78 |
| 48 | Example | Nanocrystal | 83.4Fe—5.6Nb—2B—7.7Si—1.3Cu | 25 | BaO—ZnO—$B_2O_3$—$SiO_2$—$Al_2O_3$ | 70Fe—10Ni—20Cr | 1:1 | 27 | 20 | 0.73 |
| 49 | Example | Nanocrystal | 83.4Fe—5.6Nb—2B—7.7Si—1.3Cu | 25 | BaO—ZnO—$B_2O_3$—$SiO_2$—$Al_2O_3$ | 70Fe—10Ni—20Cr | 1:2 | 28 | 21 | 0.74 |
| 50 | Example | Nanocrystal | 83.4Fe—5.6Nb—2B—7.7Si—1.3Cu | 25 | BaO—ZnO—$B_2O_3$—$SiO_2$—$Al_2O_3$ | 70Fe—10Ni—20Cr | 1:10 | 28 | 21 | 0.76 |
| 51 | Example | Nanocrystal | 83.4Fe—5.6Nb—2B—7.7Si—1.3Cu | 25 | BaO—ZnO—$B_2O_3$—$SiO_2$—$Al_2O_3$ | 70Fe—10Ni—20Cr | 1:100 | 28 | 22 | 0.77 |
| 52 | Example | Nanocrystal | 83.4Fe—5.6Nb—2B—7.7Si—1.3Cu | 25 | BaO—ZnO—$B_2O_3$—$SiO_2$—$Al_2O_3$ | 70Fe—10Ni—20Cr | 1:1000 | 28 | 22 | 0.78 |
| 53 | Example | Nanocrystal | 83.4Fe—5.6Nb—2B—7.7Si—1.3Cu | 25 | BaO—ZnO—$B_2O_3$—$SiO_2$—$Al_2O_3$ | 70Fe—10Ni—20Cr | 1:10000 | 28 | 21 | 0.76 |
| 54 | Comparative example | Nanocrystal | 86.2Fe—12Nb—1.8B | 25 | $P_2O_5$—ZnO—$R_2O$—$Al_2O_3$ | — | — | 29 | 19 | 0.66 |
| 55 | Example | Nanocrystal | 86.2Fe—12Nb—1.8B | 25 | $P_2O_5$—ZnO—$R_2O$—$Al_2O_3$ | Fe | 1:1 | 27 | 19 | 0.71 |
| 56 | Example | Nanocrystal | 86.2Fe—12Nb—1.8B | 25 | $P_2O_5$—ZnO—$R_2O$—$Al_2O_3$ | Fe | 1:2 | 27 | 19 | 0.72 |
| 57 | Example | Nanocrystal | 86.2Fe—12Nb—1.8B | 25 | $P_2O_5$—ZnO—$R_2O$—$Al_2O_3$ | Fe | 1:10 | 28 | 21 | 0.74 |
| 58 | Example | Nanocrystal | 86.2Fe—12Nb—1.8B | 25 | $P_2O_5$—ZnO—$R_2O$—$Al_2O_3$ | Fe | 1:100 | 28 | 21 | 0.76 |
| 59 | Example | Nanocrystal | 86.2Fe—12Nb—1.8B | 25 | $P_2O_5$—ZnO—$R_2O$—$Al_2O_3$ | Fe | 1:1000 | 28 | 22 | 0.77 |
| 60 | Example | Nanocrystal | 86.2Fe—12Nb—1.8B | 25 | $P_2O_5$—ZnO—$R_2O$—$Al_2O_3$ | Fe | 1:10000 | 28 | 22 | 0.78 |
| 61 | Example | Nanocrystal | 86.2Fe—12Nb—1.8B | 25 | $P_2O_5$—ZnO—$R_2O$—$Al_2O_3$ | 70Fe—10Ni—20Cr | 1:1 | 28 | 20 | 0.71 |
| 62 | Example | Nanocrystal | 86.2Fe—12Nb—1.8B | 25 | $P_2O_5$—ZnO—$R_2O$—$Al_2O_3$ | 70Fe—10Ni—20Cr | 1:2 | 27 | 19 | 0.72 |
| 63 | Example | Nanocrystal | 86.2Fe—12Nb—1.8B | 25 | $P_2O_5$—ZnO—$R_2O$—$Al_2O_3$ | 70Fe—10Ni—20Cr | 1:10 | 27 | 20 | 0.74 |
| 64 | Example | Nanocrystal | 86.2Fe—12Nb—1.8B | 25 | $P_2O_5$—ZnO—$R_2O$—$Al_2O_3$ | 70Fe—10Ni—20Cr | 1:100 | 27 | 20 | 0.74 |
| 65 | Example | Nanocrystal | 86.2Fe—12Nb—1.8B | 25 | $P_2O_5$—ZnO—$R_2O$—$Al_2O_3$ | 70Fe—10Ni—20Cr | 1:1000 | 27 | 21 | 0.77 |
| 66 | Example | Nanocrystal | 86.2Fe—12Nb—1.8B | 25 | $P_2O_5$—ZnO—$R_2O$—$Al_2O_3$ | 70Fe—10Ni—20Cr | 1:10000 | 27 | 21 | 0.78 |

According to Table 1 and 2, it was confirmed that the magnetic permeability and the DC superimposition property of the dust core improved since the soft magnetic metal fine particle having a predetermined aspect ratio existed inside of the coating part. In other words, the magnetic properties such as the magnetic permeability and the DC superimposition property of the dust core were maintained while securing the insulation property between the particles.

(Experiments 67 to 108)

Soft magnetic metal powder was produced as same as Experiments 1 to 66 except that thickness of a coating part and presence of a soft magnetic fine particle were constituted as shown in Table 3. A dust core sample was produced as similar to Experiments 1 to 66 except that the produced soft magnetic metal powder was used, and 3 wt % of resin was used with respect to 100 wt % of the powder. A magnetic permeability (μ0) of the produced dust core was evaluated as same as Experiments 1 to 66.

Further, voltage was applied using a source meter on top and bottom of the dust core sample, and the voltage when 1 mA of current flew was divided by a distance between electrodes, thereby a withstand voltage was obtained. In the present examples, among the samples having same composition of the soft magnetic metal powder, same average particle size (D50), and same amount of resin when forming the dust core, a sample showing a higher withstand voltage than the withstand voltage of the samples of the comparative example were considered good. This is because the withstand voltage changes depending on the amount of resin. The results are shown in Table 3.

TABLE 3

| | | Soft magnetic metal powder | | | | | | | Dust core | | |
|---|---|---|---|---|---|---|---|---|---|---|---|
| | | Soft magnetic metal particle | | | Coating part | | | | | Property | |
| | | | | | | | Soft magnetic metal fine particle | | | | |
| Experiment No. | Comparative example/ Example | Crystal type | Composition | Average particle size D50 (μm) | Coating material | Thickness (nm) | Composition | Aspect ratio | Resin amount (wt %) | Magnetic permeability μ0 | Withstand voltage (V/mm) |
| 67 | Comparative example | Amorphous | 87.55Fe—6.7Si—2.5Cr—2.5B—0.75C | 20 | $P_2O_5$—ZnO—$R_2O$—$Al_2O_3$ | 1 | — | — | 3 | 29 | 232 |
| 68 | Comparative example | Amorphous | 87.55Fe—6.7Si—2.5Cr—2.5B—0.75C | 20 | $P_2O_5$—ZnO—$R_2O$—$Al_2O_3$ | 5 | — | — | 3 | 28 | 321 |
| 69 | Comparative example | Amorphous | 87.55Fe—6.7Si—2.5Cr—2.5B—0.75C | 20 | $P_2O_5$—ZnO—$R_2O$—$Al_2O_3$ | 20 | — | — | 3 | 28 | 466 |
| 70 | Comparative example | Amorphous | 87.55Fe—6.7Si—2.5Cr—2.5B—0.75C | 20 | $P_2O_5$—ZnO—$R_2O$—$Al_2O_3$ | 50 | — | — | 3 | 26 | 521 |
| 71 | Comparative example | Amorphous | 87.55Fe—6.7Si—2.5Cr—2.5B—0.75C | 20 | $P_2O_5$—ZnO—$R_2O$—$Al_2O_3$ | 100 | — | — | 3 | 24 | 612 |
| 72 | Comparative example | Amorphous | 87.55Fe—6.7Si—2.5Cr—2.5B—0.75C | 20 | $P_2O_5$—ZnO—$R_2O$—$Al_2O_3$ | 150 | — | — | 3 | 23 | 654 |
| 73 | Comparative example | Amorphous | 87.55Fe—6.7Si—2.5Cr—2.5B—0.75C | 20 | $P_2O_5$—ZnO—$R_2O$—$Al_2O_3$ | 200 | — | — | 3 | 22 | 677 |
| 74 | Example | Amorphous | 87.55Fe—6.7Si—2.5Cr—2.5B—0.75C | 20 | $P_2O_5$—ZnO—$R_2O$—$Al_2O_3$ | 1 | Fe | 1:2 | 3 | 29 | 345 |
| 75 | Example | Amorphous | 87.55Fe—6.7Si—2.5Cr—2.5B—0.75C | 20 | $P_2O_5$—ZnO—$R_2O$—$Al_2O_3$ | 5 | Fe | 1:2 | 3 | 28 | 454 |
| 76 | Example | Amorphous | 87.55Fe—6.7Si—2.5Cr—2.5B—0.75C | 20 | $P_2O_5$—ZnO—$R_2O$—$Al_2O_3$ | 20 | Fe | 1:2 | 3 | 29 | 587 |
| 77 | Example | Amorphous | 87.55Fe—6.7Si—2.5Cr—2.5B—0.75C | 20 | $P_2O_5$—ZnO—$R_2O$—$Al_2O_3$ | 50 | Fe | 1:2 | 3 | 28 | 654 |
| 78 | Example | Amorphous | 87.55Fe—6.7Si—2.5Cr—2.5B—0.75C | 20 | $P_2O_5$—ZnO—$R_2O$—$Al_2O_3$ | 100 | Fe | 1:2 | 3 | 27 | 703 |
| 79 | Example | Amorphous | 87.55Fe—6.7Si—2.5Cr—2.5B—0.75C | 20 | $P_2O_5$—ZnO—$R_2O$—$Al_2O_3$ | 150 | Fe | 1:2 | 3 | 24 | 745 |
| 80 | Example | Amorphous | 87.55Fe—6.7Si—2.5Cr—2.5B—0.75C | 20 | $P_2O_5$—ZnO—$R_2O$—$Al_2O_3$ | 200 | Fe | 1:2 | 3 | 23 | 767 |
| 81 | Comparative example | Nanocrystal | 83.4Fe—5.6Nb—2B—7.7Si—1.3Cu | 25 | $P_2O_5$—ZnO—$R_2O$—$Al_2O_3$ | 1 | — | — | 3 | 28 | 187 |
| 82 | Comparative example | Nanocrystal | 83.4Fe—5.6Nb—2B—7.7Si—1.3Cu | 25 | $P_2O_5$—ZnO—$R_2O$—$Al_2O_3$ | 5 | — | — | 3 | 28 | 271 |
| 83 | Comparative example | Nanocrystal | 83.4Fe—5.6Nb—2B—7.7Si—1.3Cu | 25 | $P_2O_5$—ZnO—$R_2O$—$Al_2O_3$ | 20 | — | — | 3 | 28 | 365 |
| 84 | Comparative example | Nanocrystal | 83.4Fe—5.6Nb—2B—7.7Si—1.3Cu | 25 | $P_2O_5$—ZnO—$R_2O$—$Al_2O_3$ | 50 | — | — | 3 | 26 | 412 |
| 85 | Comparative example | Nanocrystal | 83.4Fe—5.6Nb—2B—7.7Si—1.3Cu | 25 | $P_2O_5$—ZnO—$R_2O$—$Al_2O_3$ | 100 | — | — | 3 | 25 | 523 |
| 86 | Comparative example | Nanocrystal | 83.4Fe—5.6Nb—2B—7.7Si—1.3Cu | 25 | $P_2O_5$—ZnO—$R_2O$—$Al_2O_3$ | 150 | — | — | 3 | 23 | 563 |
| 87 | Comparative example | Nanocrystal | 83.4Fe—5.6Nb—2B—7.7Si—1.3Cu | 25 | $P_2O_5$—ZnO—$R_2O$—$Al_2O_3$ | 200 | — | — | 3 | 22 | 591 |
| 88 | Example | Nanocrystal | 83.4Fe—5.6Nb—2B—7.7Si—1.3Cu | 25 | $P_2O_5$—ZnO—$R_2O$—$Al_2O_3$ | 1 | Fe | 1:2 | 3 | 28 | 307 |
| 89 | Example | Nanocrystal | 83.4Fe—5.6Nb—2B—7.7Si—1.3Cu | 25 | $P_2O_5$—ZnO—$R_2O$—$Al_2O_3$ | 5 | Fe | 1:2 | 3 | 28 | 375 |
| 90 | Example | Nanocrystal | 83.4Fe—5.6Nb—2B—7.7Si—1.3Cu | 25 | $P_2O_5$—ZnO—$R_2O$—$Al_2O_3$ | 20 | Fe | 1:2 | 3 | 30 | 486 |
| 91 | Example | Nanocrystal | 83.4Fe—5.6Nb—2B—7.7Si—1.3Cu | 25 | $P_2O_5$—ZnO—$R_2O$—$Al_2O_3$ | 50 | Fe | 1:2 | 3 | 29 | 514 |
| 92 | Example | Nanocrystal | 83.4Fe—5.6Nb—2B—7.7Si—1.3Cu | 25 | $P_2O_5$—ZnO—$R_2O$—$Al_2O_3$ | 100 | Fe | 1:2 | 3 | 28 | 612 |

TABLE 3-continued

| Experiment No. | Comparative example/ Example | Soft magnetic metal powder: Soft magnetic metal particle: Crystal type | Composition | Average particle size D50 (μm) | Coating part: Coating material | Thickness (nm) | Soft magnetic metal fine particle: Composition | Aspect ratio | Dust core: Resin amount (wt %) | Property: Magnetic permeability μ0 | Withstand voltage (V/mm) |
|---|---|---|---|---|---|---|---|---|---|---|---|
| 93 | Example | Nanocrystal | 83.4Fe—5.6Nb—2B—7.7Si—1.3Cu | 25 | $P_2O_5$—ZnO—$R_2O$—$Al_2O_3$ | 150 | Fe | 1:2 | 3 | 24 | 653 |
| 94 | Example | Nanocrystal | 83.4Fe—5.6Nb—2B—7.7Si—1.3Cu | 25 | $P_2O_5$—ZnO—$R_2O$—$Al_2O_3$ | 200 | Fe | 1:2 | 3 | 23 | 687 |
| 95 | Comparative example | Crystalline | 93.5Fe—6.5Si | 20 | $P_2O_5$—ZnO—$R_2O$—$Al_2O_3$ | 1 | — | — | 3 | 27 | 204 |
| 96 | Comparative example | Crystalline | 93.5Fe—6.5Si | 20 | $P_2O_5$—ZnO—$R_2O$—$Al_2O_3$ | 5 | — | — | 3 | 28 | 253 |
| 97 | Comparative example | Crystalline | 93.5Fe—6.5Si | 20 | $P_2O_5$—ZnO—$R_2O$—$Al_2O_3$ | 20 | — | — | 3 | 27 | 343 |
| 98 | Comparative example | Crystalline | 93.5Fe—6.5Si | 20 | $P_2O_5$—ZnO—$R_2O$—$Al_2O_3$ | 50 | — | — | 3 | 28 | 382 |
| 99 | Comparative example | Crystalline | 93.5Fe—6.5Si | 20 | $P_2O_5$—ZnO—$R_2O$—$Al_2O_3$ | 100 | — | — | 3 | 29 | 454 |
| 100 | Comparative example | Crystalline | 93.5Fe—6.5Si | 20 | $P_2O_5$—ZnO—$R_2O$—$Al_2O_3$ | 150 | — | — | 3 | 23 | 543 |
| 101 | Comparative example | Crystalline | 93.5Fe—6.5Si | 20 | $P_2O_5$—ZnO—$R_2O$—$Al_2O_3$ | 200 | — | — | 3 | 21 | 677 |
| 102 | Example | Crystalline | 93.5Fe—6.5Si | 20 | $P_2O_5$—ZnO—$R_2O$—$Al_2O_3$ | 1 | Fe | 1:2 | 3 | 27 | 307 |
| 103 | Example | Crystalline | 93.5Fe—6.5Si | 20 | $P_2O_5$—ZnO—$R_2O$—$Al_2O_3$ | 5 | Fe | 1:2 | 3 | 28 | 357 |
| 104 | Example | Crystalline | 93.5Fe—6.5Si | 20 | $P_2O_5$—ZnO—$R_2O$—$Al_2O_3$ | 20 | Fe | 1:2 | 3 | 28 | 448 |
| 105 | Example | Crystalline | 93.5Fe—6.5Si | 20 | $P_2O_5$—ZnO—$R_2O$—$Al_2O_3$ | 50 | Fe | 1:2 | 3 | 27 | 480 |
| 106 | Example | Crystalline | 93.5Fe—6.5Si | 20 | $P_2O_5$—ZnO—$R_2O$—$Al_2O_3$ | 100 | Fe | 1:2 | 3 | 26 | 553 |
| 107 | Example | Crystalline | 93.5Fe—6.5Si | 20 | $P_2O_5$—ZnO—$R_2O$—$Al_2O_3$ | 150 | Fe | 1:2 | 3 | 24 | 637 |
| 108 | Example | Crystalline | 93.5Fe—6.5Si | 20 | $P_2O_5$—ZnO—$R_2O$—$Al_2O_3$ | 200 | Fe | 1:2 | 3 | 23 | 771 |

According to Table 3, it was confirmed that both the magnetic properties and the withstand voltage can be attained by setting the thickness of the coating part within a predetermined range. Also, it was confirmed that the DC superimposition property of the dust core did not decrease even when the coating part was thickened by including the soft magnetic metal fine particle having a predetermined aspect ratio in the coating part.

(Experiments 109 to 136)

The powder including a particle constituted from the soft magnetic metal having the composition shown in Table 4, and having the average particle size D50 shown in Table 4 was prepared, and as similar to Experiments 1 to 66, the coating part was formed using the coating material having the composition shown in Table 4. Note that, the powder glass amount was 3 wt % or less with respect to 100 wt % of the powder when the average particle size (D50) of the powder was 3 μm or less; and it was 1 wt % when the average particle size (D50) of the powder was 5 μm or more and 10 μm or less; and it was 0.5 wt % when the average particle size (D50) of the powder was 20 μm or more. This is because the amount of the glass powder necessary for forming the predetermined thickness differs depending on the particle size of the soft magnetic metal powder to which the coating part is formed.

In the present example, the coercivity of the powder before forming the coating part and the coercivity of the powder after the coating part was formed were measured. 20 mg of powder and paraffin were placed in a plastic case of ϕ 6 mm×5 mm, and the paraffin was melted and solidified to fix the powder, thereby the coercivity was measured using a coercimeter (K-HC1000) made by TOHOKU STEEL Co., Ltd. A magnetic field while measuring was 150 kA/m. Also, a ratio of the coercivity before and after the coating part was formed was calculated. The results are shown in Table 4.

Also, the powder before forming the coating part was subjected to X-ray diffraction analysis and the average crystallite size was calculated. The results are shown in Table 4. Note that, the samples of Experiments 116 to 120 were amorphous, hence the crystallite size was not measured.

TABLE 4

| Experiment No. | Comparative example/ Example | Soft magnetic metal powder — Soft magnetic metal particle — Crystal type | Composition | Average particle size D50 (μm) | Coating part — Coating material | Coating part — Soft magnetic metal fine particle — Composition | Aspect ratio | Before forming — Coating part — Average crystallite size (nm) | Coercivity (Oe) | After forming Coating part Coercivity (Oe) | Before forming/ After forming |
|---|---|---|---|---|---|---|---|---|---|---|---|
| 109 | Example | Crystalline | Fe | 1.2 | $P_2O_5$—ZnO—$R_2O$—$Al_2O_3$ | Fe | 1:2 | 10 | 9 | 12 | 1.3 |
| 110 | Example | Crystalline | Fe | 1.2 | $P_2O_5$—ZnO—$R_2O$—$Al_2O_3$ | Fe | 1:2 | 35 | 18 | 21 | 1.2 |
| 111 | Example | Crystalline | Fe | 1.2 | $P_2O_5$—ZnO—$R_2O$—$Al_2O_3$ | Fe | 1:2 | 50 | 23 | 28 | 1.2 |
| 112 | Example | Crystalline | Fe | 1.2 | $P_2O_5$—ZnO—$R_2O$—$Al_2O_3$ | Fe | 1:2 | 80 | 140 | 321 | 2.3 |
| 113 | Example | Crystalline | 55Fe—45Ni | 5.0 | $P_2O_5$—ZnO—$R_2O$—$Al_2O_3$ | Fe | 1:2 | 1000 | 10 | 21 | 2.1 |
| 114 | Example | Crystalline | 55Fe—45Ni | 5.0 | $P_2O_5$—ZnO—$R_2O$—$Al_2O_3$ | Fe | 1:2 | 3200 | 10 | 23 | 2.3 |
| 115 | Example | Crystalline | 16Fe—79Ni—5Mo | 1.2 | $P_2O_5$—ZnO—$R_2O$—$Al_2O_3$ | Fe | 1:2 | 150 | 12 | 22 | 1.8 |
| 116 | Example | Amorphous | 87.55Fe—6.7Si—2.5Cr—2.5B—0.75C | 5 | $P_2O_5$—ZnO—$R_2O$—$Al_2O_3$ | Fe | 1:2 | Amorphous | 8 | 11 | 1.4 |
| 117 | Example | Amorphous | 87.55Fe—6.7Si—2.5Cr—2.5B—0.75C | 10 | $P_2O_5$—ZnO—$R_2O$—$Al_2O_3$ | Fe | 1:2 | Amorphous | 1.7 | 3.2 | 1.9 |
| 118 | Example | Amorphous | 87.55Fe—6.7Si—2.5Cr—2.5B—0.75C | 20 | $P_2O_5$—ZnO—$R_2O$—$Al_2O_3$ | Fe | 1:2 | Amorphous | 2.5 | 4.5 | 1.8 |
| 119 | Example | Amorphous | 87.55Fe—6.7Si—2.5Cr—2.5B—0.75C | 30 | $P_2O_5$—ZnO—$R_2O$—$Al_2O_3$ | Fe | 1:2 | Amorphous | 2.4 | 3.9 | 1.6 |
| 120 | Example | Amorphous | 87.55Fe—6.7Si—2.5Cr—2.5B—0.75C | 50 | $P_2O_5$—ZnO—$R_2O$—$Al_2O_3$ | Fe | 1:2 | Amorphous | 3.8 | 7.2 | 1.9 |
| 121 | Example | Nanocrystal | 83.4Fe—5.6Nb—2B—7.7Si—1.3Cu | 5 | $P_2O_5$—ZnO—$R_2O$—$Al_2O_3$ | Fe | 1:2 | 24 | 0.5 | 0.7 | 1.4 |
| 122 | Example | Nanocrystal | 83.4Fe—5.6Nb—2B—7.7Si—1.3Cu | 25 | $P_2O_5$—ZnO—$R_2O$—$Al_2O_3$ | Fe | 1:2 | 24 | 0.8 | 0.9 | 1.1 |
| 123 | Example | Nanocrystal | 86.2Fe—12Nb—1.8B | 5 | $P_2O_5$—ZnO—$R_2O$—$Al_2O_3$ | Fe | 1:2 | 10 | 1.4 | 2.4 | 1.7 |
| 124 | Example | Nanocrystal | 86.2Fe—12Nb—1.8B | 25 | $P_2O_5$—ZnO—$R_2O$—$Al_2O_3$ | Fe | 1:2 | 11 | 1.7 | 2.3 | 1.4 |
| 125 | Example | Crystalline | 90.5Fe—4.5Si—5Cr | 5 | $P_2O_5$—ZnO—$R_2O$—$Al_2O_3$ | Fe | 1:2 | 1000 | 7 | 23 | 3.3 |
| 126 | Example | Crystalline | 90.5Fe—4.5Si—5Cr | 20 | $P_2O_5$—ZnO—$R_2O$—$Al_2O_3$ | Fe | 1:2 | 2000 | 6 | 25 | 4.2 |
| 127 | Example | Crystalline | 90.5Fe—4.5Si—5Cr | 30 | $P_2O_5$—ZnO—$R_2O$—$Al_2O_3$ | Fe | 1:2 | 2000 | 7 | 23 | 3.3 |
| 128 | Example | Crystalline | 90.5Fe—4.5Si—5Cr | 50 | $P_2O_5$—ZnO—$R_2O$—$Al_2O_3$ | Fe | 1:2 | 2000 | 8 | 25 | 3.1 |
| 129 | Example | Crystalline | 90Fe—10Si | 20 | $P_2O_5$—ZnO—$R_2O$—$Al_2O_3$ | Fe | 1:2 | 3000 | 7 | 24 | 3.4 |
| 130 | Example | Crystalline | 93.5Fe—6.5Si | 5 | $P_2O_5$—ZnO—$R_2O$—$Al_2O_3$ | Fe | 1:2 | 1300 | 8 | 23 | 2.9 |
| 131 | Example | Crystalline | 93.5Fe—6.5Si | 20 | $P_2O_5$—ZnO—$R_2O$—$Al_2O_3$ | Fe | 1:2 | 3400 | 7 | 23 | 3.3 |
| 132 | Example | Crystalline | 95.5Fe—4.5Si | 20 | $P_2O_5$—ZnO—$R_2O$—$Al_2O_3$ | Fe | 1:2 | 3500 | 7 | 23 | 3.3 |
| 133 | Example | Crystalline | 98Fe—3Si | 20 | $P_2O_5$—ZnO—$R_2O$—$Al_2O_3$ | Fe | 1:2 | 3300 | 8 | 25 | 3.1 |
| 134 | Example | Crystalline | 85Fe—9.5Si—5.5Al | 10 | $P_2O_5$—ZnO—$R_2O$—$Al_2O_3$ | Fe | 1:2 | 3300 | 8 | 23 | 2.9 |
| 135 | Example | Crystalline | 50.5Fe—44.5Ni—2Si—3Co | 5 | $P_2O_5$—ZnO—$R_2O$—$Al_2O_3$ | Fe | 1:2 | 1200 | 7 | 21 | 3.0 |
| 136 | Example | Crystalline | 50.5Fe—44.5Ni—2Si—3Co | 20 | $P_2O_5$—ZnO—$R_2O$—$Al_2O_3$ | Fe | 1:2 | 3300 | 8 | 23 | 2.9 |

According to Table 4, in case the average crystallite size was within the above mentioned range, it was confirmed that the coercivity of before and after forming the coating part did not increase as much.

DESCRIPTION OF THE REFERENCE NUMERAL

1 . . . Coated particle
2 . . . Soft magnetic metal particle
10 . . . Coating part
20 . . . Soft magnetic metal fine particle

What is claimed is:

1. A soft magnetic metal powder comprising coated particles, each of the coated particles comprises a soft magnetic metal particle including Fe and a coating part having an insulation property, wherein the coating part is formed on a surface of the soft magnetic metal particle, a soft magnetic metal fine particle exists inside the coating part and is completely surrounded by the coating part, an aspect ratio of the soft magnetic metal fine particle is 1:2 to 1:10000, the coating part includes at least one selected from the group consisting of a phosphate based glass, a bismuthate based glass and a borosilicate based glass, as a main component, and a thickness of the coating part is 1 nm or more and 200 nm or less.

2. The soft magnetic metal powder according to claim 1, wherein a thickness of the coating part is 1 nm or more and 100 nm or less.

3. The soft magnetic metal powder according to claim 1, wherein the soft magnetic metal particle includes a crystalline region, and an average crystallite size is 1 nm or more and 50 nm or less.

4. The soft magnetic metal powder according to claim 1, wherein the soft magnetic metal particle is amorphous.

5. A dust core comprising the soft magnetic metal powder according to claim 1.

6. A magnetic component comprising the dust core according to claim 5.

7. The soft magnetic metal powder according to claim 1, wherein the soft magnetic metal particles have an average particle size (D50) within the range of 0.3 to 100 μm.

8. The soft magnetic metal powder according to claim 1, wherein the soft magnetic metal particles and the soft magnetic metal fine particle are made of the same soft magnetic material.

9. The soft magnetic metal powder according to claim 1, wherein the soft magnetic metal particles and the soft magnetic metal fine particle are made of different soft magnetic materials.

10. The soft magnetic metal powder according to claim 1, wherein the soft magnetic metal particle is spherical.

11. The soft magnetic metal powder according to claim 1, wherein the soft magnetic metal fine particle has a short diameter direction and a long diameter direction, the short diameter direction is approximately parallel to a radial direction of a coated particle of which the coating part is formed to the surface of the soft magnetic metal particle; and the long diameter direction is approximately parallel to a circumference direction of the coated particle.

12. The soft magnetic metal powder according to claim 1, wherein the coating part includes a compound of at least one element selected from the group consisting of P, Si, Bi, and Zn, and another coating part A is formed between the soft magnetic metal particle and the coating part, and wherein coating part A includes an oxide of Fe as a main component.

13. The soft magnetic metal powder according to claim 1, wherein the coating part includes a compound of P, and another coating part B is formed between the soft magnetic metal particle and the coating part, and wherein coating part B includes at least one element selected from the group consisting of Cu, W, Mo, and Cr.

14. The soft magnetic metal powder according to claim 1, wherein an entire surface of the soft magnetic metal particle is covered by the coating part.

* * * * *